(12) United States Patent
Sakakiyama

(10) Patent No.: US 6,604,595 B2
(45) Date of Patent: Aug. 12, 2003

(54) DRIVING FORCE DISTRIBUTING APPARATUS FOR A VEHICLE

(75) Inventor: Ryuzo Sakakiyama, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/982,005

(22) Filed: Oct. 19, 2001

(65) Prior Publication Data

US 2002/0046892 A1 Apr. 25, 2002

(30) Foreign Application Priority Data

Oct. 20, 2000 (JP) ...................................... P.2000-321614

(51) Int. Cl.$^7$ ............................................... B60K 17/34
(52) U.S. Cl. ......................................... 180/233; 701/89
(58) Field of Search ............................... 180/233, 248, 180/250; 701/89

(56) References Cited

U.S. PATENT DOCUMENTS 5,612,880 A * 3/1997 Kojima et al. ................. 701/75
6,463,379 B1 * 10/2002 Kohler et al. .................. 701/84

FOREIGN PATENT DOCUMENTS

JP          9-240301          9/1997

\* cited by examiner

Primary Examiner—Kevin Hurley
(74) Attorney, Agent, or Firm—Smith, Gambrell & Russell, LLP

(57) ABSTRACT

A four-wheel drive vehicle in which the engine output is transmitted to front wheels and to rear wheel through a transfer clutch. The control unit determines a road gradient from the output value of a longitudinal acceleration sensor at a stop, sets a lower limit on the basis of the road gradient and is prepared for a start by outputting a drive signal corresponding to lower limit to a clutch control valve for controlling the applying force of the transfer clutch. Thus, the applying force is set according to the road gradient so that the main drive wheels at the slope can be prevented from slipping by the minimum transmission torque.

12 Claims, 7 Drawing Sheets

DRIVING FORCE DISTRIBUTING APPARATUS FOR A VEHICLE

BACKGROUND OF THE INVENTION

The present invention relates to a driving force distributing apparatus for a four-wheel drive vehicle, in which most of a driving force output of an engine is directly transmitted to main drive wheels, and a required minimum output thereof is transmitted to auxiliary drive wheels.

In the prior art, known is a technique for controlling a distribution of the driving force such that the power is transmitted directly to either one of a front-wheel drive system and a rear-wheel drive system and the power is transmitted through a coupling unit such as a clutch to the other drive system.

In this kind of the four-wheel drive vehicles, there have been many trial experiments for lowering necessary strength of such a power transmission mechanism as the coupling unit and an axle as a differential for the four-wheel drive by lowering a transmitting capacity to the auxiliary drive wheels as much as possible for making the four-wheel drive mechanism light in weight. However when starting on an uphill road with a low-friction coefficient $\mu$, an excessive slip of the main drive wheels is liable to occur to raise a problem that a sufficient traction performance cannot be achieved as the four-wheel drive.

In Japanese Patent Unexamined Publication No. 9-240301, therefore, there has been disclosed a following technique. In the technique, front wheels as the main drive wheels and a hydraulic pump are driven by the engine, and the power drives the vehicle with the front wheels. On the other hand, oil pumped by a hydraulic pump is fed to a variable displacement pump motor. Then, rear wheels as an auxiliary drive wheels are driven by a variable displacement pump motor. If a slippage occurs at a start on the low-$\mu$ road such as a icy road or a road covered with snow, a number of rotations of the front wheels exceeds that of the rear wheels. According to the difference of the numbers between those of the front and rear two wheels, therefore, the transmitted torque of the variable displacement pump motor to the rear wheels is set variable. At the same time, in the case of running on a steep uphill, a high driving torque is transmitted to the rear wheels on the basis of the output value detailed by an inclinometer.

According to the technique thus disclosed in that Application, the torque corresponding to the slippage amount can be transmitted to the auxiliary drive wheels so that the torque to be transmitted to the auxiliary drive wheels can be reduced to the necessary minimum value.

According to the technique disclosed above, however, the torque in the auxiliary drive wheels do not increase before the slippage occurs in the main drive wheels, when the torque to be transmitted to the auxiliary drive wheels is detected in terms of the revolution difference of the main drive wheels due to the slippage. For the vehicle aiming at increasing a climbing ability for a road gradient of 20 degrees with the road friction coefficient of 0.03, for example, the torque to be transmitted to the auxiliary drive wheels will increase by 40% or more than that of no slippage, if it is assumed that the slippage occurs in the main drive wheels so that the friction coefficient between the road surface and the wheels drops to 0.1. There is required further torque for preventing the slippage in the main drive wheels.

The torques have to be increased by about 20% or more, although the torques are determined on the moment of inertia in the main drive wheel system and on how the slippage was avoided for a short time period.

When the slippage occurs in the main drive wheels, more specifically, the capacity of the torque to be transmitted to the auxiliary drive wheels has to be required 1.6 times or more than that of the target performance torque. This causes a defect that the entire apparatus becomes large and heavy.

In order to detect the road gradient, moreover, a unique inclinometer has to be specially provided. Because of this, it is raised a problem that the number of parts and manufacturing cost are increased.

SUMMARY OF THE INVENTION

In view of the background thus far described, it is an object of the present invention to provide a driving force distributing apparatus for a vehicle, which can prevent the slippage of the main drive wheels reliably at the slope running time including the start, without increasing the torque to be transmitted to the auxiliary drive wheels, more than necessary, to thereby reduce the size of the entire system, and also minimize the rise in the cost without increase the number of parts.

In order to achieve the above-specified object, according to a first aspect of the invention, there is provided a driving force distributing apparatus for a vehicle (e.g., a four-wheel drive vehicle), for transmitting a driving power directly to main drive wheels, and to auxiliary drive wheels via a coupling unit. The apparatus comprises basic torque setting means for setting a basic torque to be transmitted to the auxiliary drive wheels on the basis of driving states of the vehicle, road gradient correction coefficient setting means for determining a gradient correction coefficient corresponding to a gradient of a road by comparing an output value of a longitudinal acceleration sensor mounted on the vehicle and an acceleration determined on the basis of a speed of the vehicle, auxiliary drive wheel torque setting means for setting an auxiliary drive wheel torque by correcting the basic torque with the gradient correction coefficient and driving means for driving said coupling unit to generate a transmission torque corresponding to the auxiliary drive wheel torque.

With this construction, first of all, a basic torque to be transmitted to the auxiliary drive wheels connected to the prime mover via the transmission torque capacity variable type coupling unit is set on the basis of a driving state of a vehicle. A gradient correction coefficient corresponding to the gradient of a road is determined by comparing an output value of a longitudinal acceleration sensor mounted on the vehicle and an acceleration determined on the basis of a vehicle speed. An auxiliary drive wheel torque is set by correcting the basic torque with the gradient correction coefficient. The transmission torque capacity variable type coupling unit is caused by drive means to generate a transmission torque corresponding to the auxiliary drive wheel torque.

According to a second aspect of the invention, there is provided a driving force distributing apparatus for a vehicle (e.g., a four-wheel drive vehicle) for transmitting an engine output directly to main drive wheels, and to auxiliary drive wheels via a coupling unit. The apparatus comprises auxiliary drive wheel torque setting means for setting an auxiliary drive wheel torque on the basis of a road gradient determined on the basis of an output value of a longitudinal acceleration sensor mounted on the running vehicle at a low speed or at a stop and driving means for driving said coupling unit to generate a transmission torque corresponding to the auxiliary drive wheel torque.

With this construction, first of all, a road gradient is determined on the basis of an output value of a longitudinal acceleration sensor mounted on a vehicle at a driving time of an extremely low speed or at a stop. Then, an auxiliary drive wheel torque is set on the basis of the road gradient and coupling unit which has the variable transmission torque capacity is caused to generate a transmission torque corresponding to the auxiliary drive wheel torque.

According to a third aspect of the invention, there is provided a driving force distributing apparatus for a vehicle (e.g., a four-wheel drive vehicle) for transmitting an engine output to main drive wheels, and to auxiliary drive wheels via a coupling unit. The apparatus comprises basic torque setting means for setting a basic torque to be transmitted to the auxiliary drive wheels, on the basis of a driving state of the vehicle, theoretical acceleration setting means for setting a theoretical acceleration at a time of running on a flat road on the basis of an equation of motion of the vehicle from the engine output and a driving force determined by preset vehicle specifications, estimated acceleration setting means for computing an estimated acceleration from a wheel speed, auxiliary drive wheel torque setting means for setting an auxiliary drive wheel torque on the basis of a road gradient determined by comparing said theoretical acceleration and the estimated acceleration and driving means for driving said coupling unit to generate a transmission torque corresponding to the auxiliary drive wheel torque.

With this construction, first of all, a basic torque to be transmitted to the auxiliary drive wheels is set on the basis of a driving state of a vehicle, a theoretical acceleration at the time of running on a flat road is set on the basis of the equation of motion of the vehicle from the output of the prime mover and the driving force determined by preset vehicle items. An estimated acceleration is computed from a wheel speed. An auxiliary drive wheel torque is set on the basis of a road gradient determined by comparing a vehicle body acceleration and the estimated acceleration and drive means causes the transmission torque capacity variable type coupling unit for connecting the prime mover and the auxiliary drive wheels to generate a transmission torque corresponding to the auxiliary drive wheel torque.

In this case, in the present invention it is preferable that the auxiliary drive wheel torque setting means sets a corrected auxiliary drive wheel torque by correcting the set auxiliary drive wheel torque with a steering angle correction coefficient set on the basis of a steering angle.

Further, in the present invention, it is advantageous that the auxiliary drive wheel torque set by the auxiliary drive wheel torque setting means is reduced and corrected after the start.

Furthermore, in the present invention, it is advantageous that the corrected auxiliary drive wheel torque set by the auxiliary drive wheel torque setting means is reduced and corrected after the start.

Moreover, in the present invention, it is advantageous that the steering angle correction coefficient has characteristics to decrease in proportion to the steering angle.

DETAILED DESCRIPTION OF THE INVETNION

Figure 1:
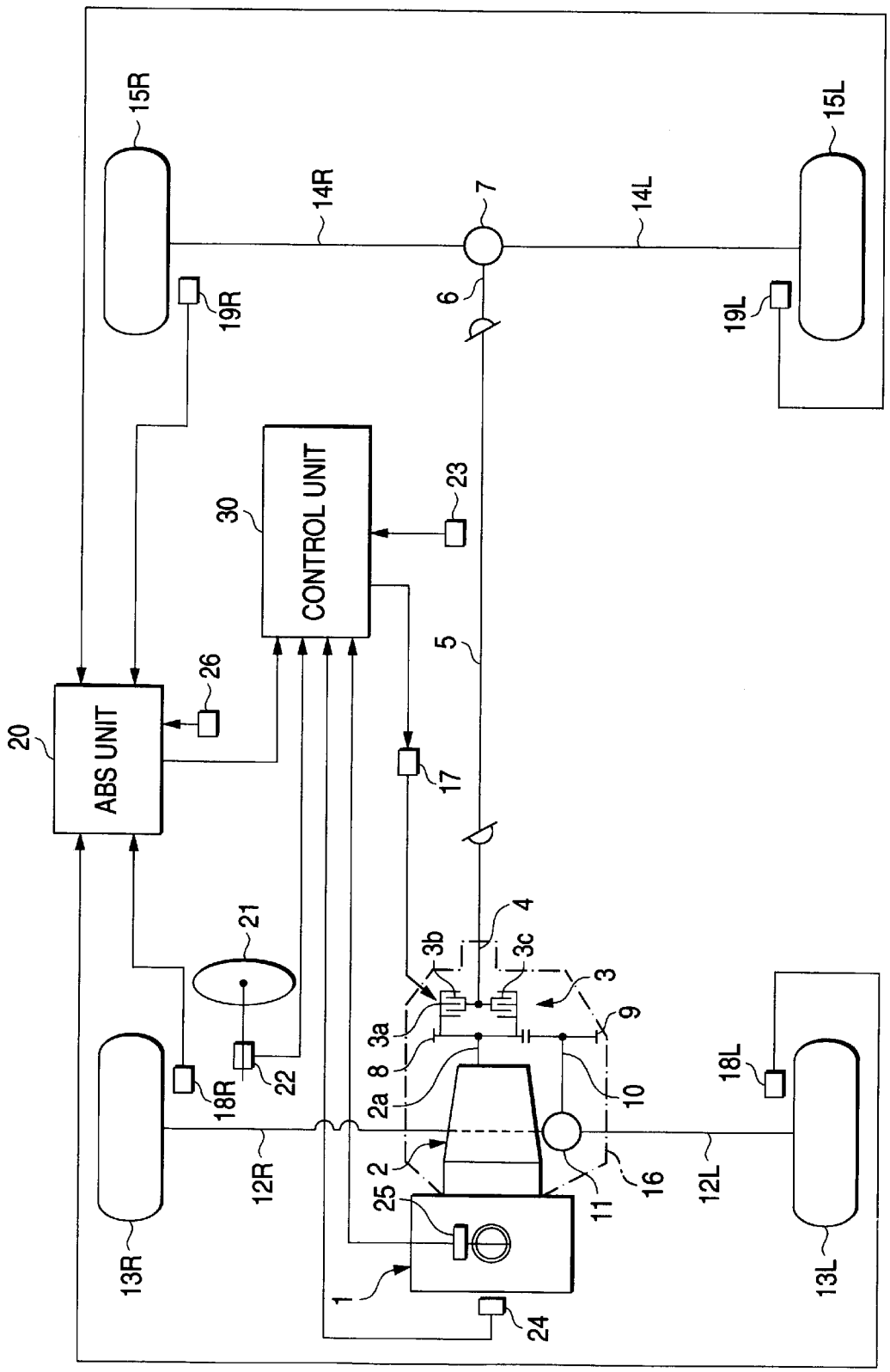
FIG. 1 is a structural diagram showing a four-wheel drive control system according to a first embodiment as a whole.

One embodiment of the present invention will be described with reference to the accompanying drawings. FIGS. 1 to 7 show a first embodiment of the invention. FIG. 1 is a structual diagram showing a four-wheel drive control system as a whole. As shown in FIG. 1, the vehicle is exemplified by a front-wheel drive based four-wheel drive vehicle which has front wheels as main drive wheels and rear wheels as auxiliary drive wheels. Here, this embodiment could be applied even to a rear-wheel drive based four-wheel vehicle by using the rear wheels as the main drive wheels and the front wheels as the auxiliary drive wheels.

In the front portion of the four-wheel drive vehicle, there is arranged an engine 1 for generating a driving force. A transmission mechanism unit 2 such as an automatic transmission using a torque converter or a manual transmission including a clutch mechanism unit is connected to an output shaft of the engine 1. An input shaft 2a extending from the rear portion of the transmission mechanism unit 2 is connected via a rear drive shaft 4 through a transfer clutch 3 such as a coupling unit of a transmission torque capacity variable type. On the other hand, a rear differential 7 is connected on the back of the rear drive shaft 4 via a propeller shaft 5 and a drive pinion shaft 6.

The transfer clutch 3 includes a clutch drum 3a mounted on the transfer input shaft 2a, and a clutch hub 3b mounted on the rear drive shaft 4. Between the clutch drum 3a and the clutch hub 3b, there is interposed a hydraulic multi-disc type clutch plate 3c in which drive plates to be connected to the clutch drum 3a and driven plates to be connected to the clutch hub 3b are alternately arranged.

On the other hand, the clutch drum 3a is equipped with a transfer drive gear 8, and a front drive gear 9 meshing with the transfer drive gear 8 is fixed on a front drive shaft 10. Moreover, the front drive shaft 10 is connected to a front differential 11.

On the other hand, a left front wheel 13L is connected to the front differential 11 via a front-wheel left drive shaft 12L. A right front wheel 13R is connected to the front differential 11 via a front-wheel right drive shaft 12R. A left rear wheel 15L is connected to the rear differential 7 via a rear-wheel left drive shaft 14L. A right rear wheel 15R is connected to the rear differential 7 via a rear-wheel right drive shaft 14R. Here, reference numeral 16 designates a transfer case housing the transmission mechanism unit 2, the transfer clutch 3 and so on.

On the other hand, an applying force of the clutch plate 3c of the transfer clutch 3 is variable by the hydraulic force which is fed from a hydraulic system (not-shown) through a clutch control valve 17 functioning as drive means. In a released state, a front wheel drive is established. As the applying force of the clutch plate 3c is raised increased, the torque distribution to the rear wheel is increased so that the torques to be distributed to the front and rear wheels are equalized in the completely applied engaged state.

On the other hand, reference numeral 20 designates an ABS unit, which is based on signals from individual wheel speed sensors 18L, 18R, 19L and 19R attached to front and rear wheels 13L, 13R, 15L and 15R, respectively, to control the oil pressures of the not-shown brake systems thereby to avoid the wheels from being locked at the braking time. With the ABS unit 20, moreover, there is connected a longitudinal acceleration sensor (as will be abbreviated into the "longitudinal G sensor") for detecting the acceleration in the longitudinal direction of the vehicle body.

On the other hand, reference numeral 30 designates a control unit for controlling the applying force of the transfer clutch 3. The control unit 30 is connected with the ABS unit 20 via a serial line. With the control unit 30, there are connected sensors including: a steering angle sensor 22 mounted on a steering wheel 21 for detecting a steering angle θst; a shift position sensor 23 for detecting a shift position; an engine speed sensor 24 for detecting an engine speed Ne; and a throttle opening sensor 25 for detecting throttle opening θth.

With the control unit 30, there is further connected an actuator such as the aforementioned clutch control valve 17 for controlling the oil pressure to the transfer clutch 3. The clutch control valve 17 controls the applying force of the transfer clutch 3 to make the torque distribution to the front and rear wheels variable according to the speed difference between the front and rear wheels. Thereby the control unit 30 makes a slip control for preventing the slippage of wheels on a road surface of a low road friction coefficient $\mu$ (i.e., a low $\mu$ road)

Where a wheel speed difference (or an RPM difference) between the front and rear wheels occurs as at a start on a road surface having longitudinally different road friction coefficients, more specifically, the applying force of the transfer clutch 3 is intensified via the clutch control valve 17 toward the direct connection to suppress the occurrence of the slippage.

In this case, the applying force of the transfer clutch 3 is controlled according to the necessary torque to be transmitted to the rear wheels 15L, 15R. The transmission torque control is made in the control unit 30, as will be specified with reference to the flow charts of FIGS. 2 to 4.

Figure 2:
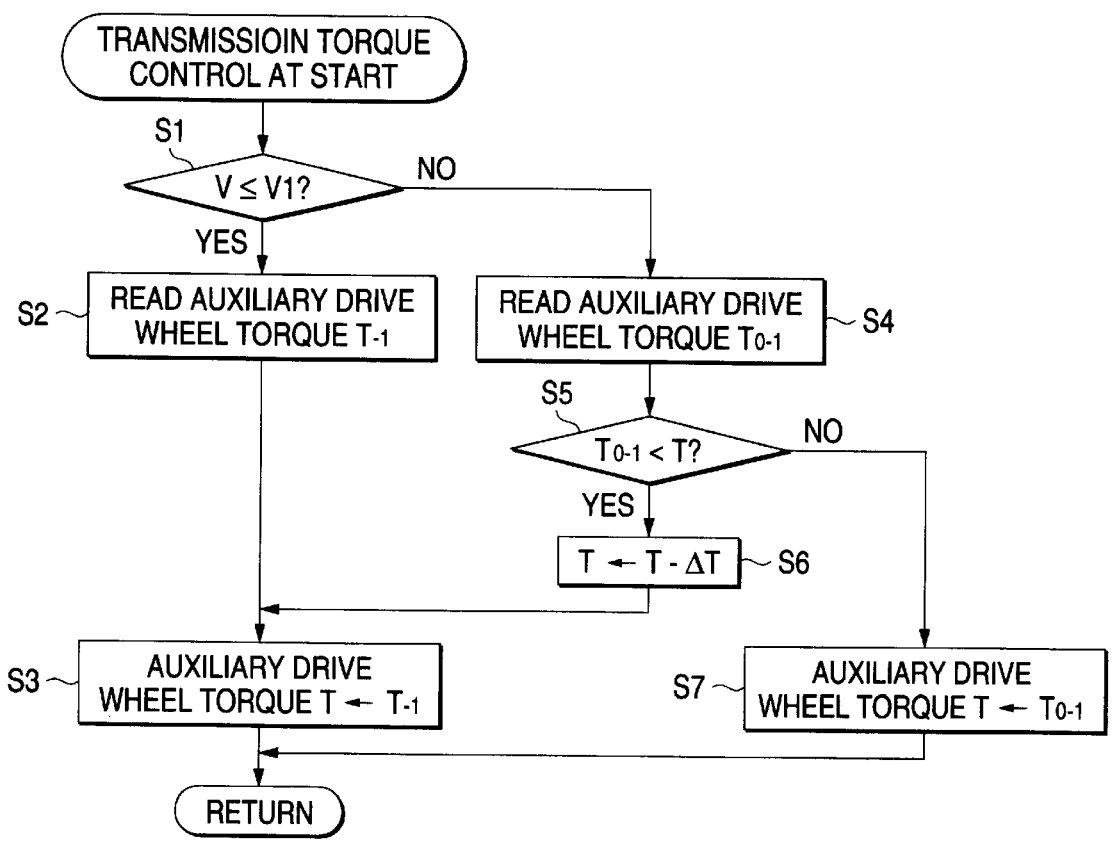
FIG. 2 is a flow chart showing a transmission torque control routine at a start of the first embodiment.

When the not-shown ignition switch is turned ON, a transmission torque control routine at start, as shown in FIG. 2, is started. At first Step S1, whether or not the vehicle is at a stop is decided by comparing a vehicle speed V, as determined from an average value of the individual wheel speeds detected by the wheel speed sensors 18L, 18R, 19L and 19R, and a start deciding vehicle speed V1 (e.g., 2 Km/h). If substantially at the stop of V≦V1, the routine advances to Step S2, at which there is read an auxiliary drive wheel torque T-1 set at the previous drive time. At Step S3, this auxiliary drive wheel torque T-1 is set to an auxiliary drive wheel torque T at this time (T←T-1), and the routine is left for a start.

Then, a drive signal corresponding to the auxiliary drive wheel torque T is outputted from the control unit 30 to the clutch control valve 17. Where a duty solenoid valve is used as the clutch control valve 17, the control unit 30 computes a duty ratio on the basis of s lower limit T1 of an auxiliary drive wheel torque for controlling the operating oil pressure of the transfer clutch 3, thereby to control the applying force of the transfer clutch 3.

Where the vehicle stops on a sloped road, the road gradient at the previous stop is detected in a later-described transmission torque control routine at the stop, so that the auxiliary drive wheel torque T-1 is set according to the road gradient. At the start, on the basis of this auxiliary drive wheel torque T-1, the necessary minimum applying force is set for the transfer clutch 3.

By thus making the applying force necessary minimum for the transfer clutch 3, the capacities of the transfer clutch 3 and the pump for feeding the oil pressure to the transfer clutch 3 can be reduced to realize the size reduction and the light weight of the entire system.

When a starting operation is then performed so that the vehicle speed V exceeds the start deciding vehicle speed V1, the routine is branched from Step S1 to Step S4, at which there is read an auxiliary drive wheel basic torque T0-1 set at the previous drive time. At Step S5, there are compared the auxiliary drive wheel basic torque T0-1 and the auxiliary drive wheel torque T. The auxiliary drive wheel basic torque T0-1 is a basic value corresponding to a flat road run, which is set in the later-described transmission torque control routine on the basis of an engine torque Te and the vehicle speed V just before the stop.

For T0-1<T, moreover, the routine advances to Step S6, at which the auxiliary drive wheel torque T is updated (T←T−ΔT) with the value reduced by a set reduction value ΔT1, and the routine returns to Step S3. The reduction value ΔT1 is set to an optimum value according to the computation period. Here, the reduction value ΔT1 may be made variable according to the auxiliary drive wheel torque lower limit T1.

For T0-1≦T, on the other hand, the routine advances to Step S7, at which the auxiliary drive wheel basic torque T0-1 is set and outputted as the auxiliary drive wheel torque T at the time (T←T0-1), and the routine is terminated.

Figure 4:
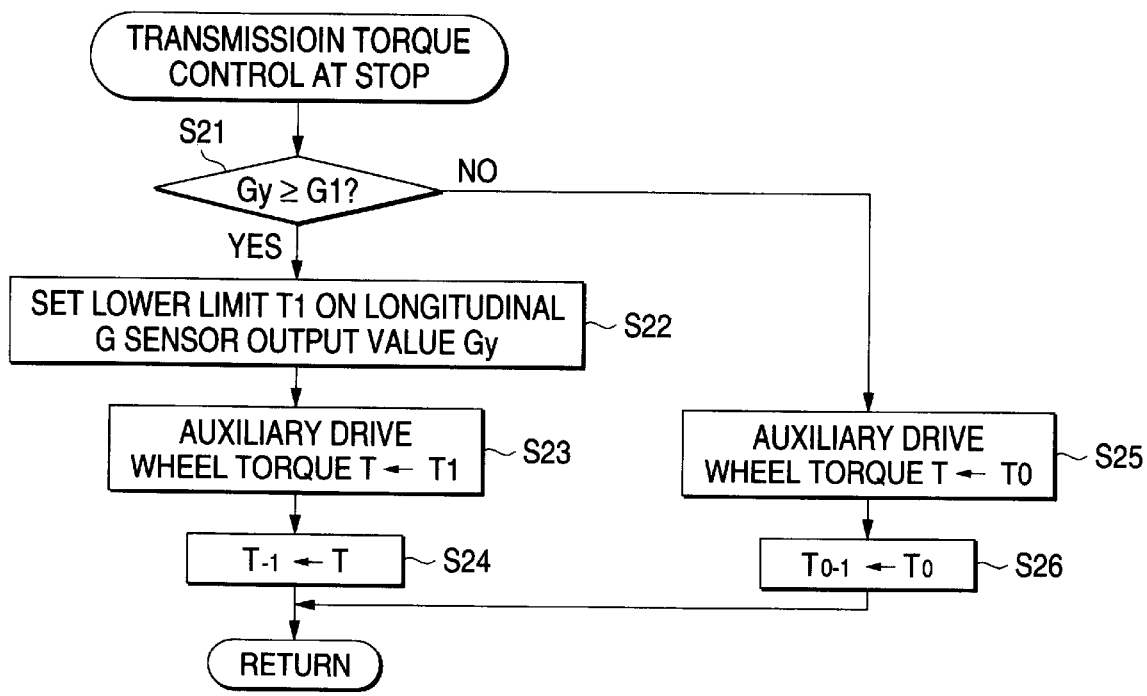
FIG. 4 is the flow chart showing the transmission torque control routine at a stop of the first embodiment.

As a result, the auxiliary drive wheel torque T-1 to be read at the start on the slope, for example, has a relation of T-1>T0-1 at the start because the auxiliary drive wheel torque lower limit T1 is set on the basis of the road gradient in the later-described transmission torque control routine at the stop, as shown in FIG. 4.

At the start, therefore, the lower limit T1 of the auxiliary drive wheel torque set at the previous engine stop is set as the auxiliary drive wheel torque T. When the vehicle speed V exceeds the start deciding vehicle speed V1 after the start, there is repeatedly executed the subroutine of Step S→Step S4→Step S5→Step S6→Step S3. When the relations of T0-1≦T are reached before long, the routine advances to Step S7, at which the auxiliary drive wheel basic torque T0-1 is updated (T←T0-1) as the auxiliary drive wheel torque T at this time, and the routine ends for the ordinary running control.

Figure 3:
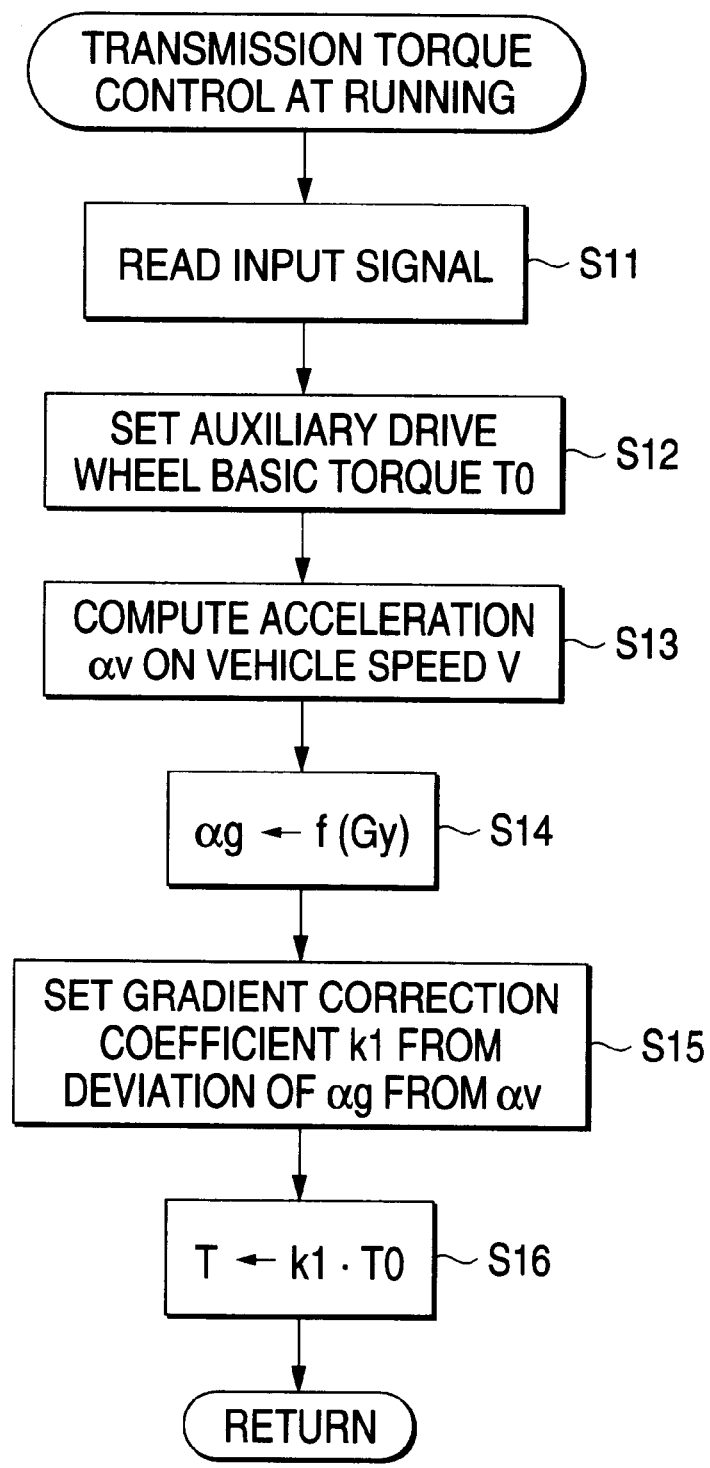
FIG. 3 is the flow chart showing the transmission torque control routine at a running time of the first embodiment.

When the vehicle comes into the ordinary run, there is executed the transmission torque control routine at the running time, as shown in FIG. 3. At first, at Step S11, the input signals from the individual sensors are read in. At Step S12, the auxiliary drive wheel basic torque T0 is set with reference to the auxiliary drive wheel basic torque map by using the engine torque Te, the vehicle speed V and the gear stage as parameters.

Figure 5:
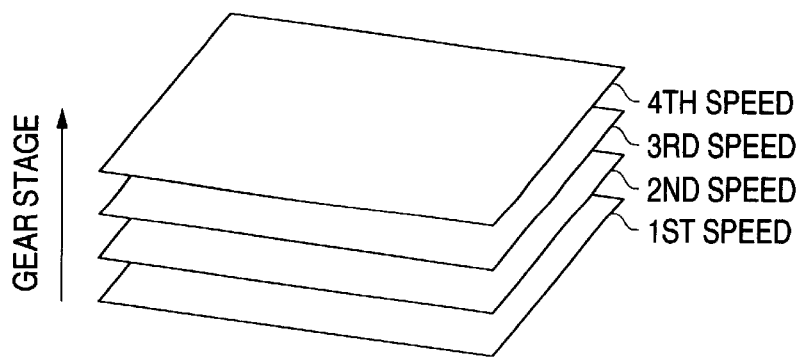
FIG. 5 is an explanatory diagram of an auxiliary drive wheel basic torque map of the first embodiment.
Figure 6:
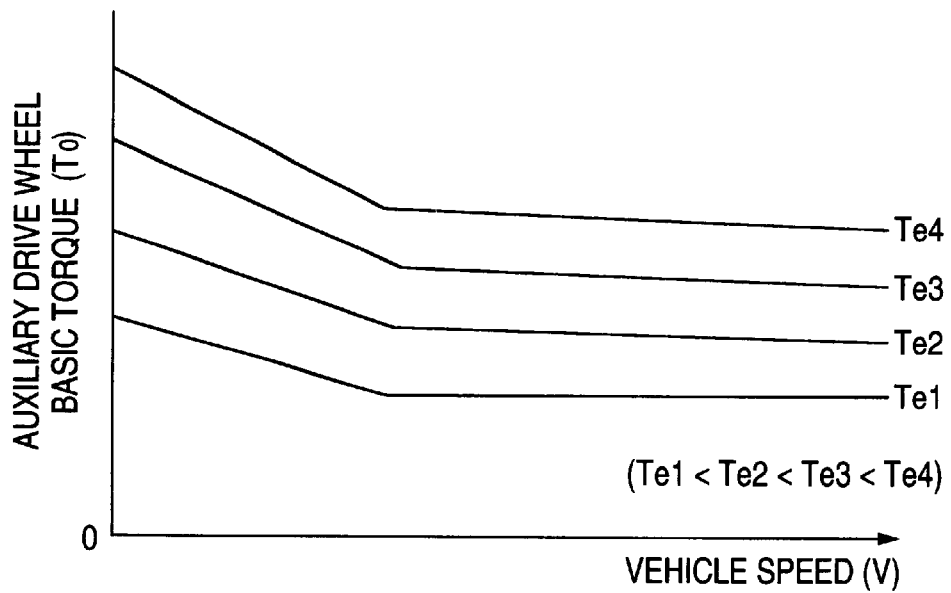
FIG. 6 is an explanatory diagram of the auxiliary drive wheel basic torque map at each gear stage of the first embodiment.

As shown in FIG. 5, the auxiliary drive wheel basic torque map is prepared for each gear stage. As illustrated in FIG. 6, on the other hand, each auxiliary drive wheel basic torque map is characterized such that the auxiliary drive wheel basic torque T0 increases as the engine torque Te increases, and such that the auxiliary drive wheel basic torque T0 decreases as the vehicle speed V increases.

Here in this embodiment, the engine torque Te is divided into four stages Te1 to Te4 (Te1<Te2<Te3<Te4) but may be divided more finely. On the other hand, the engine torque Te is set with reference to the map, for example, on the basis of the engine speed Ne and the throttle opening θth. In this case, the vehicle speed V may be set not only as the average value of the individual vehicle speeds detected by the individual wheel speed sensors 18L, 18R, 19L and 19R but also as the vehicle body speed V which is computed on the basis of the engine speed Ne, the preset items of the drive system, and the preset gear stage.

Next, the routine advances to Step S13, at which an acceleration αv (αv←|dv|/dt) is computed on the basis of the change in the vehicle speed V. At Step S14, on the other hand, an acceleration αg (αg←f (Gy)) is set on the basis of the change in the output value Gy of the longitudinal G sensor 26.

Then, the routine advances to Step S15, at which the road gradient is estimated from the deviation between the acceleration αg based on the output value of the longitudinal G sensor 26 and the acceleration a v based on the vehicle speed V. A gradient correction coefficient k1 is determined by the map retrieval or the computation on the basis of the road gradient. Here, the gradient correction coefficient k1 is substantially proportional to the estimated road gradient so that it is set to the larger value for the higher road gradient.

Where the road gradient for the vehicle to run on is designated by θ, more specifically, an output error of a sin θ (although the polarity is reversed between forward and backward runs) is made in the output value Gy of the longitudinal G sensor 26 while the vehicle is running. Therefore, the road gradient θ can be estimated by detecting the deviation between the acceleration αv based on the vehicle speed V and the acceleration αg based on the output of the longitudinal G sensor 26.

After this, the routine advances to Step S16, at which the auxiliary drive wheel basic torque T0 is corrected with the gradient correction coefficient k1 to compute the auxiliary drive wheel torque T (T←k1·T0), and the routine is terminated.

As a result, in the ordinary run, the auxiliary drive wheel torque T according to the road gradient is set so that the torque T is not increased more than necessary. It is, therefore, possible to realize the size and weight reductions of the transfer clutch 3 and the hydraulic system for feeding the appling pressure to the transfer clutch 3.

When the vehicle speed V becomes equal to or less than a stop decision vehicle speed (e.g., 2 Km/h), moreover, there is executed the transmission torque control routine at the stop, as shown in FIG. 4. This routine sets the auxiliary drive wheel torque T at the start on the basis of the parameters at or just before the stop of the vehicle. At first Step S21, there are compared the output value Gy of the longitudinal G sensor 26 and a slope decision value G1 (i.e., a value corresponding to 3 degrees in this embodiment). In the output value Gy of the longitudinal G sensor 26, as described above, the output error of sin θ is made by the road gradient. Therefore, the road gradient at the stop can be estimated by detecting the output value Gy of the longitudinal G sensor 26 just before or at the stop, that is, the value containing little acceleration or deceleration factor.

If a slope of Gy≧G1 is decided from the road gradient, moreover, the routine advances to Step S22, at which the lower limit T1 of the auxiliary drive wheel torque is set with reference to the torque lower limit map on the basis of the longitudinal G sensor 26.

Figure 7:
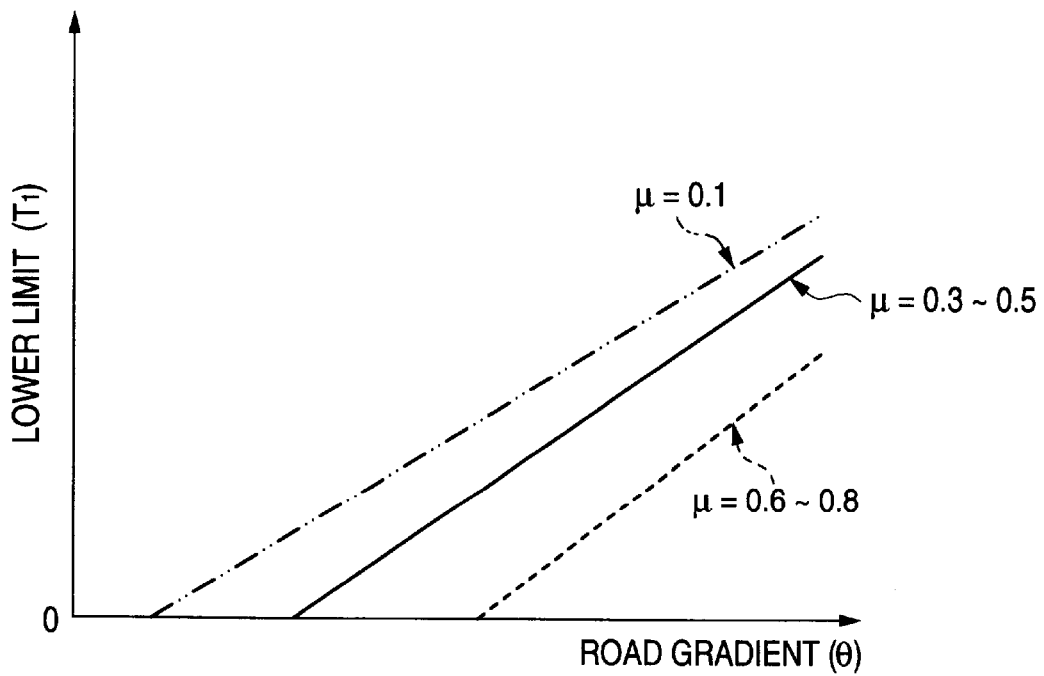
FIG. 7 is an explanatory diagram illustrating relations between an auxiliary drive wheel torque lower limit and a road gradient of the first embodiment.

FIG. 7 illustrates relations between the lower limit T1 of the necessary torque to be transmitted to the rear wheels and the road gradient θ at a slope starting time in the four-wheel drive of the front wheel drive base. The slippage of the wheels 13L, 13R, 15L, 15R is prevented by increasing the drive wheel torque to the rear wheel as the road friction coefficient μ drops. In this case, the road gradient θ and the output value Gy of the longitudinal G sensor 26 are in substantially proportional relations. The torque lower limit map is stored, according to the characteristics illustrated in FIG. 7, with the relations between the output value Gy of the longitudinal G sensor 26 and the auxiliary drive wheel torque lower limit T1.

In this case, the lower limit of the auxiliary drive wheel torque fluctuates against the road friction coefficient μ. However, the road friction coefficient μ is hard difficult to detect so that it is estimated and set to about μ=0.3 to 0.5 in this embodiment. Where the road friction coefficient μ can be detected, however, the lower limit T1 of the auxiliary drive wheel torque may be corrected on the basis of the road friction coefficient μ.

After that, the routine advances to Step S23, at which the auxiliary drive wheel torque T is set at the lower limit T1 (T←T1) of the auxiliary drive wheel torque and is outputted. At Step S24, moreover, the previous auxiliary drive wheel torque T-1 is updated by the auxiliary drive wheel torque T at this time (T-1←T), and the routine is terminated.

If it is decided at Step S21 that Gy<G1, namely, that the road surface is substantially flat, on the other hand, the routine is branched into Step S25, at which the auxiliary drive wheel torque T is set to the latest auxiliary drive wheel basic torque T0 that was set at Step S12 of the transmission torque control routine at the running time (T←T0). Then, the routine advances to Step S26, at which the previous auxiliary drive wheel basic torque T0-1 is updated by the auxiliary drive wheel basic torque T0 at this time (T0-1←T0), and the routine is terminated.

Where the vehicle resultantly stops on the slope, the auxiliary drive wheel torque T in consideration of the road gradient θ is set and prepared for a next start. Here, the lower limit T1 of the auxiliary drive wheel torque may be corrected by adding the auxiliary drive wheel basic torque T0 or by multiplying thereof by a coefficient.

Figure 8:
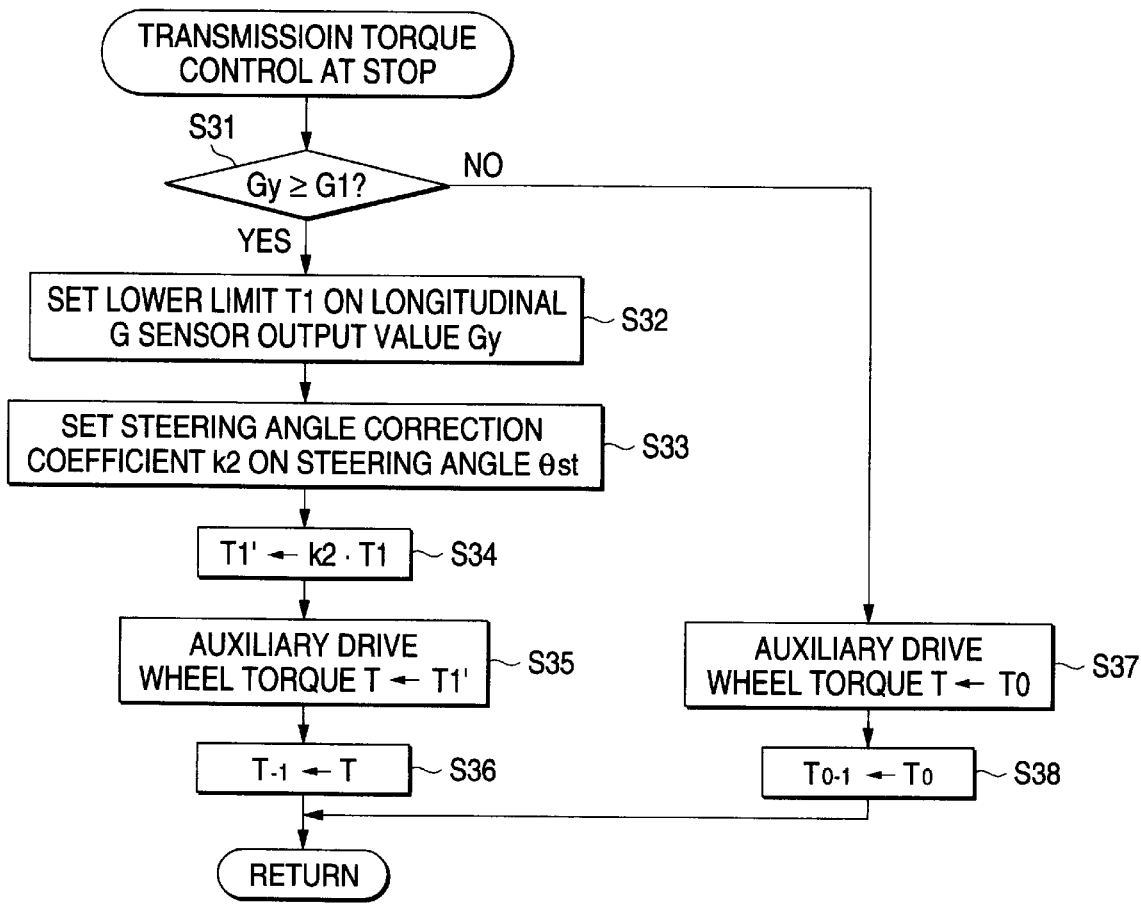
FIG. 8 is the flow chart showing the transmission torque control routine at the stop according to a second embodiment.
Figure 9:
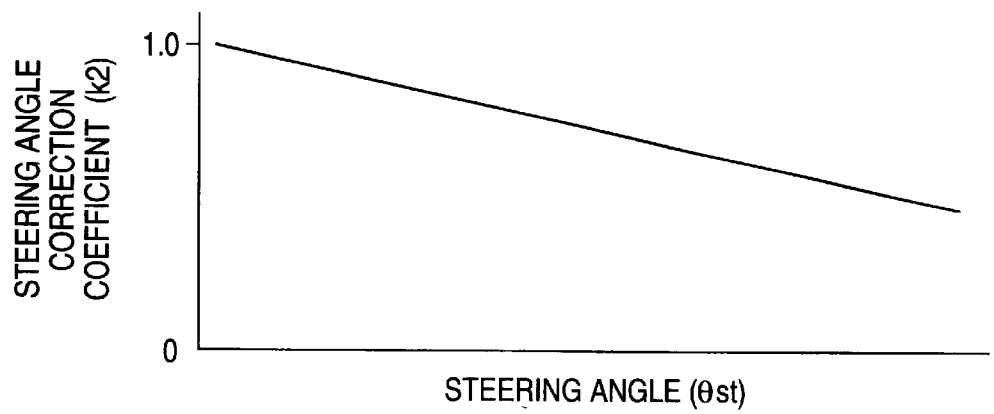
FIG. 9 is the explanatory diagram illustrating a relation between a steering angle corrected value and a steering angle of the second embodiment.

On the other hand, FIGS. 8 and 9 show a second embodiment of the present invention. In this embodiment, the lower limit T1 of the auxiliary drive wheel torque, as set in the first embodiment, is corrected with the steering angle in accordance with the steering angle θ st detected at or just before the stop by the steering angle sensor 22. The second embodiment adopts a flow chart shown in FIG. 8, in place of the flow chart of the first embodiment, as shown in FIG. 4.

First of all, at Steps S31 and S32, the output value Gy of the longitudinal G sensor 26 and the slope decision value G1 (i.e., a value corresponding to 3 degrees) are compared as at Steps S21 and S22 of FIG. 4. If a slope of Gy>G1 is decided from the road gradient θ, the routine advances to Step S32, at which the lower limit T1 of the auxiliary drive wheel torque is set with reference to the torque lower limit map on the basis of the output value Gy of the longitudinal G sensor 26.

Next, the routine advances to Step S33, at which a steering angle correction value k2 is set either with reference to the map or by a computation on the basis of the steering angle θst detected by the steering angle sensor 22. The steering angle correction value k2 reduces and corrects the lower limit T1 of the auxiliary drive wheel torque to retain the transmission torque to the front wheel side. Because the drive torque to the front wheels 13R and 13L as the main drive wheels become the lower as the steering angle θst of the front wheels 13R and 13L become the larger. The steering angle correction value k2 is reduced in proportion to the steering angle θst, as illustrated in FIG. 9.

After that, the routine advances to Step S34, at which a lower limit T1' of a corrected auxiliary drive wheel torque is set by multiplying the lower limit T1 by the steering angle correction coefficient k2 (T1'←k2·T1) At subsequent Step S35, the auxiliary drive wheel torque T is set with the lower limit T1' (T←T1') and is outputted.

At Step S36, moreover, the previous auxiliary drive wheel torque T-1 is updated by the auxiliary drive wheel torque T at this time (T-1←T), and the routine is terminated.

At Step S31, if it is decided that Gy<G1, on the other hand, the routine is branched into Step S37, at which the auxiliary drive wheel torque T is set with the latest auxiliary drive wheel basic torque T0 that was set at Step S12 of the transmission torque control routine at the running time (T←T0), as at Step S25 of FIG. 4, and is outputted. Then, the routine advances to Step S38, at which the previous auxiliary drive wheel basic torque T0-1 is updated by the auxiliary drive wheel basic torque T0 at this time (T0-1←T0), and the routine is terminated.

As a result, in the start control from the state in which the vehicle stops on the slope, the applying force to the transfer clutch 3 is set with the auxiliary drive wheel torque T which was reduced and corrected in proportion to the steering angle θst. Even at a slope start from the state in which the front wheels 13R and 13L are being steered, therefore, the reduction in the drive torque of the front wheels 13R and 13L can be relatively suppressed to avoid the slip occurrence effectively.

Figure 10:
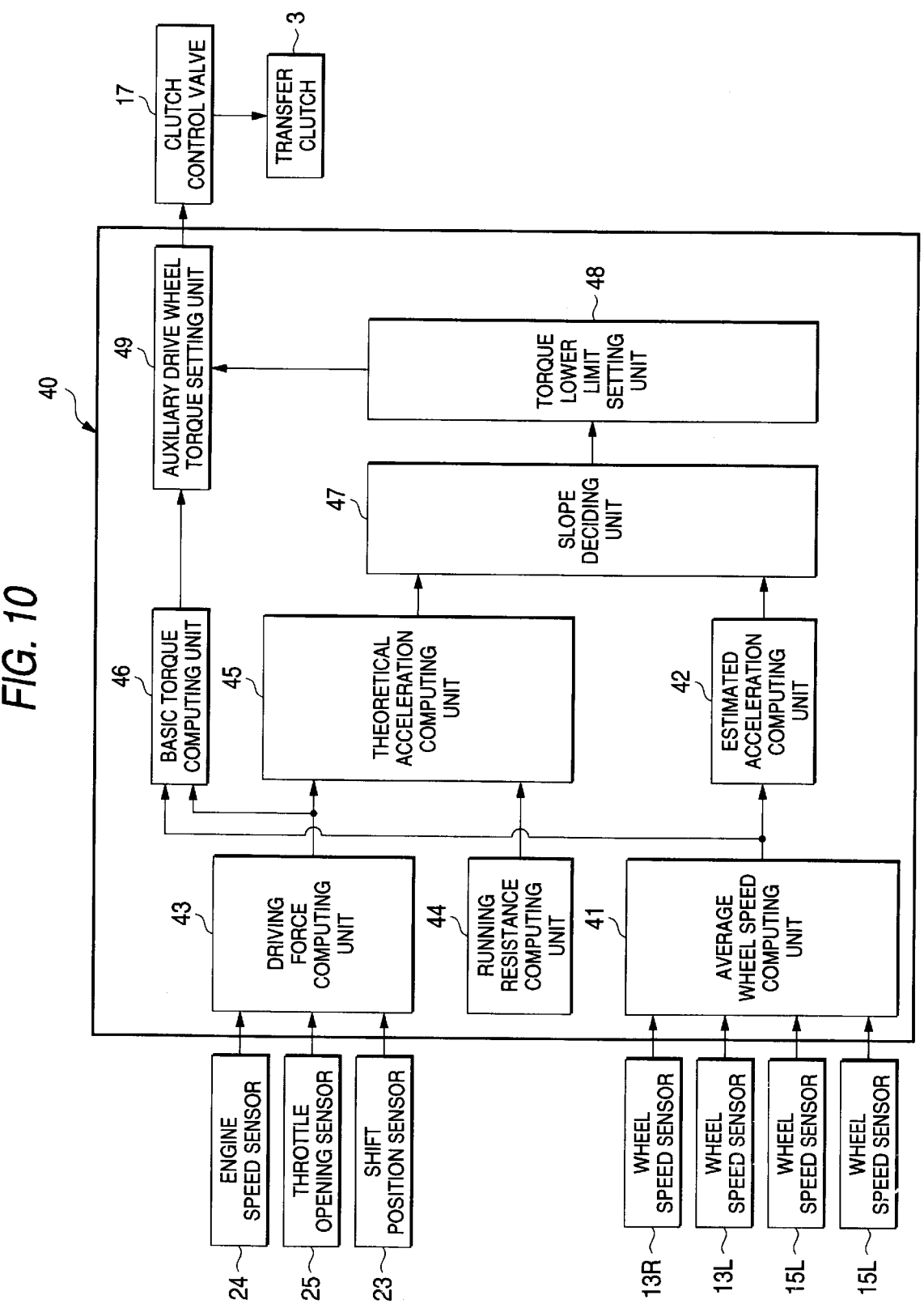
FIG. 10 is a functional block diagram of a control unit according to a third embodiment.

On the other hand, FIG. 10 is a functional block diagram showing a driving force distributing apparatus according to a third embodiment of the present invention. In this embodiment, whether the road being presently traveled is flat or sloped is decided by comparing the theoretical acceleration and the estimated acceleration. The theoretical acceleration at the time of running on the flat road is determined on the basis of an equation of motion of the vehicle from the output of the engine 1 and the driving force determined from the preset vehicle characteristics items. The estimated acceleration is determined from the changes in the wheel speeds. Therefore, the longitudinal G sensor can be omitted from this embodiment.

Reference numeral 40 appearing in FIG. 10 designates a control unit for controlling the applying force of the transfer clutch 3. The control unit 40 is equipped, as clutch control functions, with an average wheel speed computing unit 41, an estimated acceleration computing unit 42, a driving force computing unit 43, a running resistance computing unit 44, a theoretical acceleration computing unit 45, an auxiliary drive wheel basic torque computing unit 46, a slope deciding unit 47, an auxiliary drive wheel torque lower limit setting unit 48 and an auxiliary drive wheel torque setting unit 49.

The average wheel speed computing unit 41 computes an average wheel speed Va from the average of the individual wheel speeds detected by the wheel speed sensors 18L, 18R, 19L and 19R (as referred to FIG. 1).

The estimated acceleration computing unit 42 computes an estimated acceleration α0 from the change in the average wheel speed Va per unit time.

The driving force computing unit 43 computes a driving force F (Kgf) from the following Formula:

$$F = Te \cdot l \cdot \eta t / 1000 \cdot r,$$

wherein: Te designates an engine torque; l designates a total reduction ratio; ηt designates a power transmission efficiency (fixed); and r designates an effective radius (fixed) of the wheels.

Here, the engine torque Te (m-Kgf) is set either with reference to a map or by a computation on the basis of the engine speed Ne and the throttle opening θth. On the other hand, the total reduction ratio l is a reduction ratio from the engine to the drive shaft. The total reduction ratio l is computed by examining the gear ratio of a reduction mechanism corresponding to the shift position detected by the shift position sensor 23, and by computing the reduction ratio on the basis of the gear ratio.

The running resistance computing unit 44 computes a running resistance R while the vehicle is running on a flat road in a windless circumstance, from the following Formula:

$$R = Rr + Rl + Ri,$$

wherein: Rr designates a rolling resistance; Rl designates an air resistance; and Ri designates a slope climbing resistance (e.g., 0 at the time of running on the flat road).

Here, the rolling resistance Rr is computed by:

$$Rr \leftarrow \mu r \cdot W,$$

wherein: W designates a vehicle weight (Kg); and μr designates a rolling resistance coefficient determined by road surface conditions.

The air resistance Rl is computed by:

$$Rl \leftarrow \mu a \cdot S \cdot V^2,$$

wherein μa designates an air resistance coefficient determined by the shape of the vehicle; and S designates a front projected area (m²) of the vehicle.

The theoretical acceleration computing unit 45 computes a theoretical acceleration αt at when running on the flat road in calm wind conditions, from the following Formula. In this case, at that time, a surplus driving force U is:

$$U = F - R \tag{1},$$

and this surplus additional driving force U is computed by:

$$U = (1+\phi) \cdot W \cdot \alpha / g \tag{2}.$$

Wherein: φ is expressed by Wr/W; W designates a total vehicle weight; Wr designates a weight corresponding to a rotational inertia portion; and g designates a gravitational acceleration, all of which are fixed except when the vehicle body acceleration is αv. If these fixed values are expressed by a constant κ, therefore, the theoretical acceleration αt can be computed from the foregoing Formulas (1) and (2) by:

$$\alpha t = (F - R)/\kappa$$

The auxiliary drive wheel basic torque computing unit 46 sets the auxiliary drive wheel basic torque T0 on the basis of the auxiliary drive wheel basic torque maps (as referred to FIGS. 6 and 7) by using the average wheel speed Va determined in the average wheel speed computing unit 41, the engine torque computed in the driving force computing unit 43, and the prevailing gear stage, as the parameters.

The slope deciding unit 47 examines whether a slope travel or not, by comparing the estimated acceleration α0 determined in the estimated acceleration computing unit 42 and the theoretical acceleration αt determined in the theoretical acceleration computing unit 45. While a flat road is being traveled, more specifically, the estimated acceleration α and the theoretical acceleration at indicate substantially equal values (α0≈αt). While the vehicle is running on an uphill, on the other hand, the estimated acceleration α0 is less than the theoretical acceleration αt (α0<αt). The slope deciding unit 47 decides the slope, when the acceleration difference Δα between the theoretical acceleration at and the estimated acceleration α0 is larger than a preset value.

When the lower limit setting unit 48 reads the decision result of the slope deciding unit 47 and decides the slope, it sets the lower limit T1 on the basis of the acceleration difference Δα with reference to a lower limit map. Here, the lower limit map is characterized to increase the lower limit T1 substantially in proportion to the increase in the acceleration difference Δα. The minimum necessary toque according to the acceleration difference Δα stores the lower limit T1.

Moreover, the auxiliary drive wheel torque setting unit 49 reads the auxiliary drive wheel torque basic torque T0, as set in the basic torque computing unit 46, and the lower limit T1, as set in the lower limit setting unit 48. When set with the lower limit T1, the auxiliary drive wheel torque setting unit 49 sets the auxiliary drive wheel torque T with the lower limit T1 (T←T1), and outputs the corresponding drive signal to the clutch control valve 17 thereby to control the applying force of the transfer clutch 3. When running on the flat road (and on a downhill) without setting the lower limit T1, on the other hand, the auxiliary drive wheel torque setting unit 49 sets the auxiliary drive wheel torque T with the auxiliary drive wheel basic torque T0 (T←T0), and outputs the corresponding drive signal to the clutch control valve 17 thereby to control the applying force of the transfer clutch 3.

Thus according to this embodiment, whether the traveling road is an uphill or not is decided on the basis of the acceleration difference Δα between the estimated acceleration α0 and the theoretical acceleration αt. When running on the uphill road, the auxiliary drive wheel torque T is set on the basis of the acceleration difference Δα. Therefore, even the vehicle without the longitudinal G sensor can set the transmission torque to be distributed to the rear wheels properly according to the road gradient.

Here, the present invention should not be limited to the foregoing individual embodiments, but the lower limit T1 to be set in the third embodiment, for example, may be corrected according to the steering angle θst detected by the steering angle sensor 22.

Even either when running on the downhill road or uphill road, the engine brake could be effectively applied by increasing the transmission torque to the rear wheels 15L, 15R in accordance with the road gradient θ. In this case, the transmission torque to the rear wheel 15L, 15R is corrected and reduced at the braking time so as to prevent the four wheels 13L, 13R, 15L, 15R from being locked.

According to the present invention, as has been described hereinbefore, it is possible to prevent the slippage of the main drive wheels reliably at the slope running time including the start, without increasing the torque to be transmitted to the auxiliary drive wheels, more than necessary. As a result, the capacities of the coupling device for transmitting the torque and the pump for feeding the oil pressure to the coupling device can be reduced to realize the size reduction of the entire system.

Without using any special sensors such as an inclination sensor, moreover, the road gradient can be detected by using the existing sensor so that the number of parts is not increased to minimize the cost.

While there have been described in connection with the preferred embodiments of the invention, it will be clearly understood to those skilled in the art that various changes and modifications may be made therein without departing from the invention, and it is aimed, therefore, to cover in the appended claims all such changes and modifications as fall within the true spirit and scope of the invention.

What is claimed is:

1. A driving force distributing apparatus for a vehicle, for transmitting a driving power directly to main drive wheels, and to auxiliary drive wheels via a coupling unit, comprising:

basic torque setting means for setting a basic torque to be transmitted to said auxiliary drive wheels on the basis of driving states of the vehicle;

road gradient correction coefficient setting means for determining a gradient correction coefficient corresponding to a gradient of a road by comparing an output value of a longitudinal acceleration sensor mounted on the vehicle and an acceleration determined on the basis of a speed of the vehicle;

auxiliary drive wheel torque setting means for setting an auxiliary drive wheel torque by correcting said basic torque with said gradient correction coefficient; and driving means for driving said coupling unit to generate a transmission torque corresponding to said auxiliary drive wheel torque.

2. The driving for distributing apparatus for the vehicle as set forth in claim 1, wherein the auxiliary drive wheel torque set by said auxiliary drive wheel torque setting means is reduced and corrected after starting the vehicle.

3. The driving force distributing apparatus for the vehicle as set forth in claim 1, wherein said auxiliary drive wheel torque setting means sets a corrected auxiliary drive wheel torque by correcting the set auxiliary drive wheel torque with a steering angle correction coefficient set on the basis of a steering angle.

4. The driving force distributing apparatus for the vehicle as set forth in claim 3, wherein the corrected auxiliary drive wheel torque set by said auxiliary drive wheel torque setting means is reduced and corrected after starting the vehicle.

5. A driving force distributing apparatus for the vehicle as set forth in claim 3, wherein said steering angle correction coefficient has a characteristic to decrease in proportion to the steering angle.

6. The driving force distributing apparatus for the vehicle as set forth in claim 4, wherein said steering angle correction coefficient has a characteristic to decrease in proportion to the steering angle.

7. A driving force distributing apparatus for a vehicle for transmitting an engine output directly to main drive wheels, and to auxiliary drive wheels via a coupling unit, comprising:

auxiliary drive wheel torque setting means for setting an auxiliary drive wheel torque on the basis of a road gradient determined on the basis of an output value of a longitudinal acceleration sensor mounted on the running vehicle at a low speed or at a stop; and driving means for driving said coupling unit to generate a transmission torque corresponding to said auxiliary drive wheel torque.

8. The driving force distributing apparatus for the vehicle as set forth in claim 2, wherein the auxiliary drive wheel torque set by said auxiliary drive wheel torque setting means is reduced and corrected after starting the vehicle.

9. The driving force distributing apparatus for the vehicle as set forth in claim 2, wherein said auxiliary drive wheel torque setting means sets a corrected auxiliary drive wheel torque by correcting the set auxiliary drive wheel torque with a steering angle correction coefficient set on the basis of a steering angle.

10. The driving force distributing apparatus for the vehicle as set forth in claim 9, wherein the corrected auxiliary drive wheel torque setby said auxiliary drive wheel torque setting means is reduced and corrected after starting the vehicle.

11. The driving force distributing apparatus for the vehicle as set forth in claim 9, wherein said steering angle correction coefficient has a characteristic to decrease in proportion to the steering angle.

12. The driving force distributing apparatus for the vehicle as set forth in claim 10, wherein said steering angle correction coefficient has a characteristic to decrease in proportion to the steering angle.

\* \* \* \* \*